Oct. 23, 1951     H. B. PETERSON     2,572,382
CHRISTMAS TREE LIGHTING BULB SOCKET SUPPORT
Filed March 31, 1947
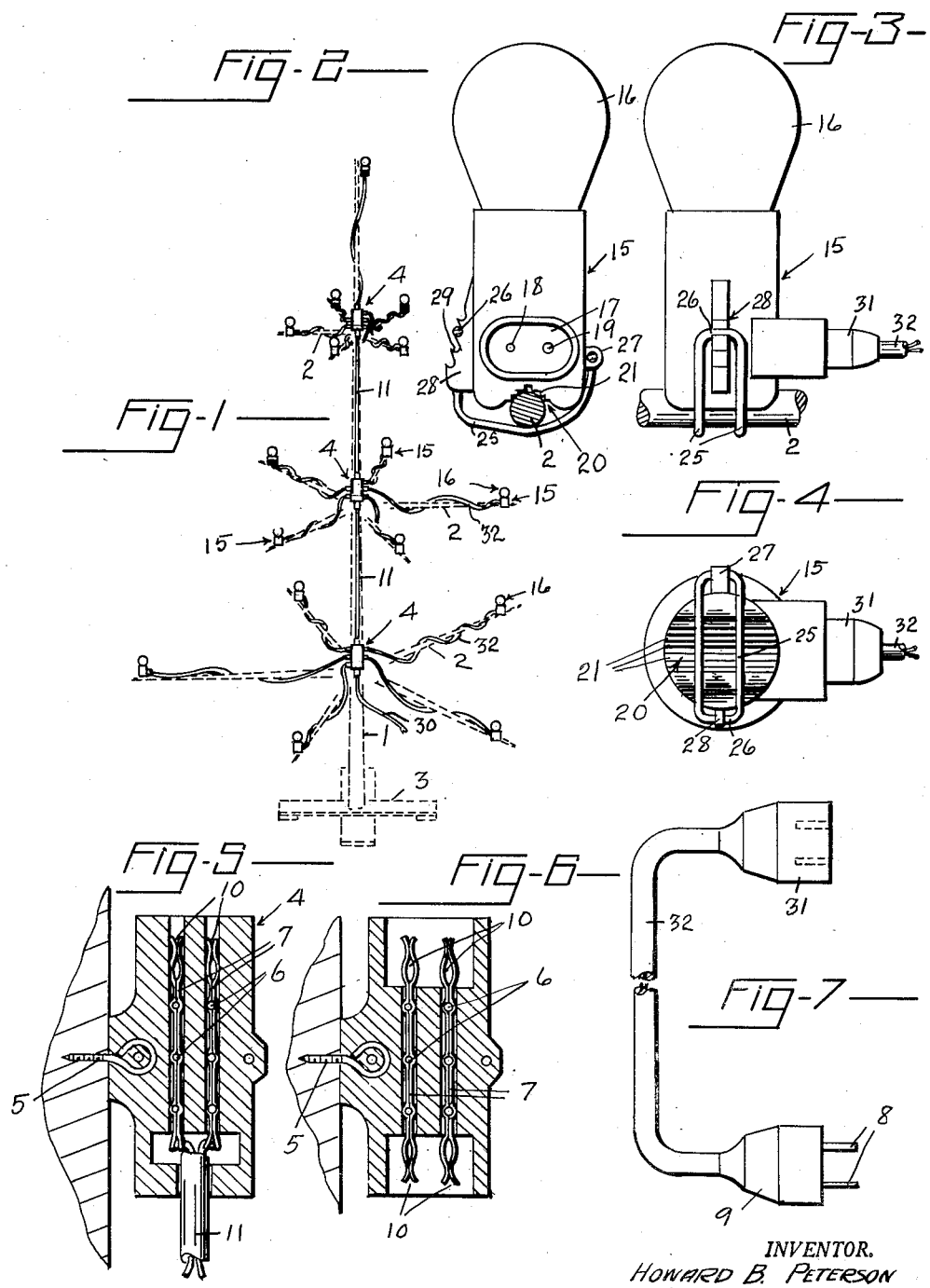
INVENTOR.
HOWARD B. PETERSON
BY
Boyken, Mohler & Buckley
ATTORNEYS Patented Oct. 23, 1951

2,572,382

UNITED STATES PATENT OFFICE 2,572,382

CHRISTMAS TREE LIGHTING BULB SOCKET SUPPORT

Howard B. Peterson, San Francisco, Calif.

Application March 31, 1947, Serial No. 738,398

1 Claim. (Cl. 240—10)

This invention relates to a Christmas tree lighting bulb socket support and has for one of its objects a system that is easily adapted to substantially any Christmas tree and that facilitates the positioning and arranging of the lights in a uniform or other manner, as desired. Another object of the invention is the provision of a safe, economical Christmas tree lighting system that is adapted to any sized tree and that can be extended or restricted, as desired, without having any surplus wires or the like in the tree.

A still further object of the invention is the provision of Christmas tree light sockets that are adapted to be quickly secured on the ends of the limbs of the tree in upright position for holding the light bulbs upright, thus enabling the use of candle type lamps if desired.

An additional object of the invention is the provision of a Christmas tree lighting system in which the wires are adapted to be inconspicuously positioned along the trunk and limbs, instead of being draped in the open.

In the conventional Christmas tree lighting systems, whether the light bulbs are connected in series or in parallel, the arranging of the bulbs is a very difficult problem. The preferred arrangement is to position the bulbs at the tips of the branches or limbs. However, this is seldom possible and attempts to accomplish this end generally results in draping cords from the end of one limb to the end of another, causing the limbs to sag due to the weight of the cord being localized at the outer ends of the branches. It is purely a matter of coincidence if the light bulbs happen to be close to the desired position relative to the branch, and some limbs go without lights while others have too many. Furthermore the light bulbs will not stand upright, like candles, and any attempt to shift the bulbs is fraught with danger to the entire tree and ornaments.

The present invention overcomes all of the above disadvantages and enables the decorator to quickly make a uniform arrangement of the lights or any other desired arrangement.

Other objects and advantages will appear in the description and in the drawings.

In the drawings, Fig. 1 is a diagrammatic view of the trunk and limbs of a Christmas tree with the present lighting system.

Fig. 2 is a side elevational view of one of the electric light bulbs in a socket of this invention.

Fig. 3 is a side elevational view of the bulb and socket of Fig. 2 as seen at right angles to the latter.

Fig. 4 is a bottom plan view of the bulb socket.

Fig. 5 is a sectional view through one form of outlet member that may be used on the tree trunk, showing the outlets for plug connectors.

Fig. 6 is a sectional view of another form of outlet member that may be used, showing the outlets for plug connectors.

Fig. 7 is a side view of one of the conductors for use on the limbs showing the plug connectors at the ends of the conductor, the latter being broken in length.

In detail, referring to Fig. 1, most all conventional Christmas trees have a trunk I from which limbs 2 extend radially at different levels. The number of levels varies with the size of the tree, but at each level the number of limbs practically never exceeds six and is usually less. The trunk is supported vertically on a base 3.

The present system includes a plurality of outlet members 4, there being preferably one outlet member at each of the different levels at which the limbs extend from the trunk I.

Each of these outlet members is preferably provided with a screw 5 projecting from the side opposite the outlets for screwing into trunk I thereby removably securing the outlet members to the tree.

Each outlet member 4 has sockets 6 between or in conductors 7 that extend in parallel spaced relationship through the member 4. These sockets are in pairs, one being in one conductor and the other being in the other conductor thus providing outlets adapted to receive the prongs 8 (Fig. 7) of a plug connector 9 (Fig. 7).

In Fig. 5 the outlet member has sockets 10 at one of the ends of conductors 7 for receiving prongs 8 of a connector 9 of the type shown in Fig. 7. The opposite ends of conductors 7 may be secured to the wires of a conductor cord 11 as shown in Fig. 5 or they may be the same as sockets 10 in Fig. 5 as best shown in Fig. 6 thus making a connector that may connect at opposite ends with a plug socket. This type may be employed for the upper connections 4 (Fig. 1). The sockets 6 open outwardly from opposite sides of each connector 4 thus providing six outlets for six plug connectors.

Each connector 4 has a screw 5 secured to the body of the connector and projecting from one side thereof that is between the opposite sides having said outlets. Thus the connectors may be quickly screwed to the trunk of the tree by merely rotating the connector, using it as a handle for the screw. While other means may be used for clamping the connectors to the tree, the screw is the preferred means, being simple, economical, strong and positive.

The electric light bulb sockets are best shown in Figs. 2, 3, 4 each of which comprises a body 15 of Bakelite or the like having a pair of outwardly opening sockets formed in two adjacent sides thereof at right angles to each other. In one of these sockets is the conventional metal socket (not shown) for receiving the base of a conventional Christmas tree light bulb 16.

In the other socket 17 extends terminal prongs 18, 19 that respectively are adapted to connect with the filament terminals of the base of lamp bulb 16 in the usual manner.

The side of the body 15 opposite the light bulb 16 is formed with a generally inverted V-shaped channel 20 having friction grooves 21 extending longitudinally along opposite sides thereof so that the body will not tend to slide around the limb of a tree when said limb 2 extends in said channel and is held against the sides thereof.

The channel 20 preferably extends parallel with the direction in which the socket 17 opens. Thus, when the body 15 is on a limb with the limb 2 in the channel the socket will face the trunk 1 of the tree.

Pivotally secured to one side of the body 1 for swinging to and from a position extending across the channel 20 is a clamp arm 25, which may be in the form of a resilient wire doubled on itself to provide spaced parallel runs extending across said channel, and a closed end 26 connecting the outer ends of said runs. The end opposite said closed end is pivotally secured in a lug 27 projecting from the side of the body.

The side of body 15 opposite lug 27 is formed with rib 28 projecting from said side, which rib has teeth 29 in its outer edge adapted to be successively engaged by the closed end 26 of the clamp. By this structure a yieldable clamping means is provided for clamping any sized limb in the channel 20. The spring of the wire forming the clamp arm enables an easy release of the end 26 from teeth 29 as well as enabling variation in the tension of the clamp against the limb.

In operation, the connectors 4 are first positioned adjacent the levels at which the limbs 2 project from the trunk 1 and are screwed to the trunk at said levels.

The conductors 11 are then connected with the connectors for connecting the latter in parallel with each other and with a source of electricity, a conductor 30 extending from the lowermost connector to a conventional outlet in the base board of a room or elsewhere.

The electric light bulb socket members may then be secured to the tips of the limbs 2, or in any desired place along the limbs, and by means of the clamping arms on said socket members, the latter may be positioned with the bulb socket opening upwardly so the bulb will be upright. The socket 17 for the connection plug 31 of the cord 32 (Fig. 7) faces toward the trunk 1, thus making it easy to insert the connector plug 9 at one end of cord 32 into any pair of outlets 6 in the connector 4 that is at the other end of the limb carrying the particular light bulb socket to be connected with said connector. The cord 32 may then be wound around limb 2 and plug connector 31 inserted in socket 17 of the body 15 thus completing the circuit.

There is no stringing of cords from limb to limb of the tree or the difficult attempt to position the cords so the lights will hang at the right points on said tree.

The disassembly of the lighting system from the tree is equally easy. The plugs 31 are disconnected from the light sockets and the latter including the bulbs are quickly removed. Thereafter the conductors 32 are removed from the limbs and from connectors 4 and finally the connectors 4 and conductors 11 are removed.

The prongs 8, 18, 19 sockets 6, 10 are preferably of different sizes on each connector 4 and plug connectors 9, 31 and on the lamp bulb socket to meet the safety requirements, such procedure being conventional.

It is to be understood that the detailed description and drawings are not to be considered restrictive of the invention, but merely illustrative of a preferred form.

I claim:

In a Christmas tree lighting system of the character described, an electric light bulb socket member comprising a body formed with outwardly opening sockets directed at substantially right angles to each other one of which is adapted to removably receive the base of an electric light bulb therein and the other being formed to receive an electrical connector plug, means carried by said body at the side thereof opposite said lamp socket for detachably securing said body on the outer end of the limb of a Christmas tree with the said lamp socket directed upwardly and with the plug socket directed toward the trunk of said tree, said means being a pair of jaws, one jaw of said pair formed on the said body and having a cross sectional contour generally conforming to the cross sectional contour of said limb, and the other jaw being provided at one of its ends with a pivot for rotatably securing said other jaw to said body for swinging in a plane transversely of said limb toward and away from the jaw on said body for engaging the side of a limb opposite that adapted to be received in said one jaw, means for releasably connecting the opposite end of said other jaw to said body at different points for adapting said jaws to various diameter limbs.

HOWARD B. PETERSON.

REFERENCES CITED

The following references are of record in the file of this patent:

UNITED STATES PATENTS

| Number | Name | Date |
|---|---|---|
| 319,177 | Bernstein | June 2, 1885 |
| 1,187,571 | Van Meer | June 20, 1916 |
| 1,922,022 | Barnett | Aug. 15, 1933 |
| 2,057,078 | Abramson | Oct. 13, 1936 |
| 2,219,568 | Stewart | Oct. 29, 1940 |
| 2,227,123 | Christen | Dec. 31, 1940 |
| 2,253,164 | Benander | Aug. 19, 1941 |
| 2,277,532 | Smith | Mar. 24, 1942 |
| 2,477,833 | Auer | Aug. 24, 1948 |

FOREIGN PATENTS

| Number | Country | Date |
|---|---|---|
| 366,351 | France | July 26, 1906 |
| 576,352 | France | May 10, 1924 |